United States Patent
Penninckx et al.

(10) Patent No.: US 7,209,658 B2
(45) Date of Patent: Apr. 24, 2007

(54) TIME DIVISION MULTIPLEX AND WAVELENGTH DIVISION MULTIPLEX OPTICAL SWITCHING NODE

(75) Inventors: Denis Penninckx, Nozay (FR);
Ludovic Noirie, Nozay (FR)

(73) Assignee: Alcatel, Paris (FR)

( * ) Notice: Subject to any disclaimer, the term of this patent is extended or adjusted under 35 U.S.C. 154(b) by 738 days.

(21) Appl. No.: 10/330,328

(22) Filed: Dec. 30, 2002

(65) Prior Publication Data

US 2004/0213571 A1    Oct. 28, 2004

(30) Foreign Application Priority Data

Jan. 3, 2002    (FR) .................................. 02 00044

(51) Int. Cl.
*H04J 14/00*    (2006.01)
(52) U.S. Cl. .............................. 398/47; 398/51; 398/52; 398/54
(58) Field of Classification Search ........... 398/43–103
See application file for complete search history.

(56) References Cited

U.S. PATENT DOCUMENTS

| | | | |
|---|---|---|---|
| 5,457,556 A * | 10/1995 | Shiragaki | 398/50 |
| 5,663,820 A * | 9/1997 | Shiragaki | 398/50 |
| 5,737,106 A * | 4/1998 | Sansonetti et al. | 398/102 |
| 5,982,767 A * | 11/1999 | McIntosh | 370/352 |
| 6,388,782 B1 * | 5/2002 | Stephens et al. | 398/79 |
| 6,389,013 B1 * | 5/2002 | Doss et al. | 370/364 |
| 6,795,652 B2 * | 9/2004 | Milton et al. | 398/79 |
| 6,931,002 B1 * | 8/2005 | Simpkins et al. | 370/354 |

FOREIGN PATENT DOCUMENTS

| EP | WO 01/95661 A1 * | 12/2001 |
|---|---|---|
| WO | WO 0195661 A1 | 12/2003 |

OTHER PUBLICATIONS

N. Ghani, "Lamba-Labeling: A Framework for IP-Over-WDM Using MPLS", Optical Networks Magazine, SPIE, Bellingham, WA, US. vol. 1, No. 2, Apr. 2000, pp. 45-58, XP000969815.

T. Matsumoto et al, "Studies on Optical Digital Cross-Connect Systems for Very-High-Speed Optical Communications Networks", IEICE Transactions on Communications, Institute of Electronics Information and Comm. Eng. , Tokyo, JP, vol. E83-B, No. 1, Jan. 2000, pp. 30-37, XP000940278.

(Continued)

*Primary Examiner*—M. R. Sedighian
(74) *Attorney, Agent, or Firm*—Sughrue Mion, PLLC

(57) ABSTRACT

The invention relates to a time division and wavelength division multiplex optical switching node for use in an optical communications network (2), which node combines a set of time division multiplex packets (8-1, 8-2, . . . , 8-i) into a wavelength division multiplex packet (18) to form a composite wavelength division multiplex packet, in particular by conferring on each time division multiplex packet (8-1, 8-2, . . . , 8-I) a respective appropriate multiplexing wavelength ($\lambda 1, \lambda 2, \ldots, \lambda i$), for example a wavelength specific to each time division multiplex packet. The invention has applications in high bit rate optical networks in particular, in which it offers versatility and transparent use of the different multiplexing modes.

11 Claims, 10 Drawing Sheets

OTHER PUBLICATIONS

R. Kannan et al, "STWNET: A High Bandwidth Space-Time-Wavelength Multiplexed Optical Switching Network", Proceedings of the IEEE Infocom '97. The Conference on Computer Communications. 16th Annual Joint Conference of the IEEE Computer and Communications Societies. Driving the Information Revolution. Kobe, Apr. 7-12, 1997, Los Alamitos, CA IEEE Compu, vol. 2, Apr. 7, 1997, pp. 777-784, XP000859147.

* cited by examiner

TIME DIVISION MULTIPLEX AND WAVELENGTH DIVISION MULTIPLEX OPTICAL SWITCHING NODE

The invention relates to packet mode optical networks for transmitting data. In packet mode, data elements with a common destination are grouped into packets which are managed in the network as unitary information structures. Packets are routed with reference to information contained in a packet header. Packet mode is very widely used in electronic communications networks and constitutes a solution for "circuit" mode optical networks, in which information travels from end to end in an undivided stream.

BACKGROUND OF THE INVENTION

Optical networks are used to convey very large volumes of digital data traffic on continental and intercontinental scales, for example for Internet multimedia applications. At present optical technology provides in-fiber bit rates of the order of one Terabit per second ($10^{12}$ bits per second), although the theoretical limits are much higher, and is therefore the solution of the future for exchanging high-density information, especially voice and video.

FIG. 1 shows an example of an optical communications network 2 deployed on the European continent and known as the European Optical Network (EON). Like any network, it includes a set of nodes 4, which are called switching matrices, interconnected by optical fiber links 6. The connectivity of a switching matrix 4, which expresses the number of links 6 that it connects, is typically of the order of three or four. Some switching matrices 4' relay calls to other continents.

Two multiplexing techniques are used for packet mode optical transmission networks:

Time division multiplexing (TDM). FIG. 2a shows the basic configuration of a packet 8 conforming to this multiplexing mode, referred to hereinafter as a TDM packet. The packet has a header 10 at one end and blocks of data 12 that constitute the payload of the packet. All the elements (payload and header) of a TDM packet 8 are carried on one carrier wavelength $\lambda i$ suitable for the network.

Wavelength division multiplexing (WDM) combines a plurality of independent data channels, each allocated its own carrier wavelength, on a single medium, in this instance an optical fiber, and reduces the bit rate per carrier, and therefore relaxes the physical constraints (bit rate limited modulation electronics, resistance to noise, etc.). FIG. 2b shows an example of a data packet 14 conveyed on a fiber using wavelength division multiplexing and four carrier wavelengths $\lambda 1$ to $\lambda 4$. Each carrier transmits respective sub-packets 8a to 8d having respective payloads 12a–12d and together forming the payload of the packet 14 conforming to this multiplexing mode, referred to hereinafter as a WDM packet. A WDM packet 14 generally includes a single header 10, which here is contained in the sub-packet 8d on the wavelength $\lambda 4$. The sub-packets 8a–8d are transported in parallel in the fiber, using the principle of linear superposition.

Because the switching matrices 4 must be dedicated either to TDM packets or to WDM packets, a conventional optical network manages only one or the other of the two multiplexing modes.

Switching matrix input and output ports use multiplexing and demultiplexing means designed to work at a wavelength or at a set of wavelengths and to route packets in accordance with protocol rules imposed by the TDM mode or by the WDM mode.

There are also optical communications networks that route data in circuit mode, i.e. without dividing the data into packets. In this context, multigranularity optical network architectures have been proposed for managing wavelength division multiplexed information. The granularity expresses the basic vector that conveys data and, depending on the network and the location within the network, can be: i) the carrier wavelength, ii) a group of wavelengths, called a band, or iii) the carrier fiber. These three forms of granularity conform to a hierarchy in the sense that fiber level granularity is a physical member and transports all of the n wavelengths accepted by the network, group level granularity constitutes a subset of m wavelengths, and wavelength level granularity comprises only one of the n or m wavelengths.

The switching matrices of a multigranularity network comply with this hierarchy in providing three respective switching stages, each equipped with its own space-division switch, namely:

a first stage, disposed between the input and output fibers of a link, which extracts a bitstream from a selected fiber, a second stage in which a demultiplexer receives the bitstream from a fiber selected by the first stage to extract a group therefrom, and a third stage in which a demultiplexer receives a group from the second stage to extract a selected wavelength therefrom.

These three stages are also adapted to carry out a converse series of multiplexing operations leading to a selected fiber from a wavelength or a group.

An architecture of the above kind is advantageous because it can convey different wavelengths on a common section of the network, not individually, but as a group, which lightens routing management by using only one port at a time for collective routing.

In the current state of the art, because control is asynchronous, a multigranularity architecture cannot be envisaged in other than the circuit mode. In packet mode transmission, at least some of the information takes the form of TDM packets, especially on the links 6, which makes it necessary to retain a synchronous mode.

The document WO 01/95661 discloses a method of managing data in the form of packets in an optical communications network; the method includes a step of combining a set of time division multiplex packets into a wavelength division multiplex packet to form a composite wavelength division multiplex packet.

The above document describes a node having:
a first level consisting of time division multiplex packet switching matrices, and
a second level consisting of a wavelength division multiplex packet switching matrix.

The first and second levels are coupled by multiplexers and spectral multiplexers.

The above prior art node switches only time division multiplex packets and its core switches only wavelength division multiplex packets containing time division multiplex packets.

OBJECT AND SUMMARY OF THE INVENTION

The object of the invention is to propose a versatile node offering transparent use of the multiplexing modes.

The invention provides an optical switching node characterized in that it comprises:
- a matrix for switching time division multiplex packets,
- a matrix for switching wavelength division multiplex packets,
- a device for forming wavelength division multiplex optical data packets, the device having an input coupled to a matrix for switching time division multiplex packets and an output coupled to a matrix for switching wavelength division multiplex packets, and
- a device for demultiplexing wavelength division multiplex optical packets, the device having an input coupled to a matrix for switching wavelength division multiplex packets and an output coupled to a matrix for switching time division multiplex packets, and in that said matrix for switching time division multiplex packets has inputs and outputs for receiving and sending wavelength division multiplex packets from and to other nodes.

BRIEF DESCRIPTION OF THE DRAWINGS

The advantages and features of the invention become more clearly apparent on reading the following description of preferred embodiments of the invention, which is given by way of non-limiting example only and with reference to the accompanying drawings, in which:

FIG. 2a, already described, is a diagram showing the basic structure of a WDM packet;

MORE DETAILED DESCRIPTION

Figure 2A:
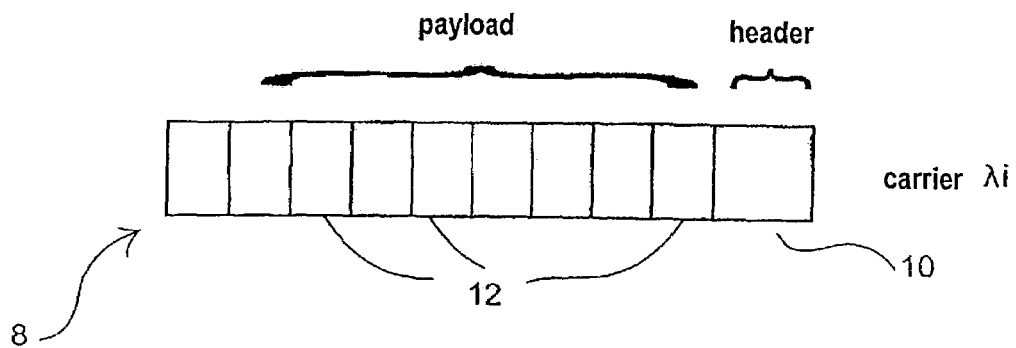
FIG. 2a, already described, is a diagram showing the basic structure of a TDM packet.
Figure 2B:
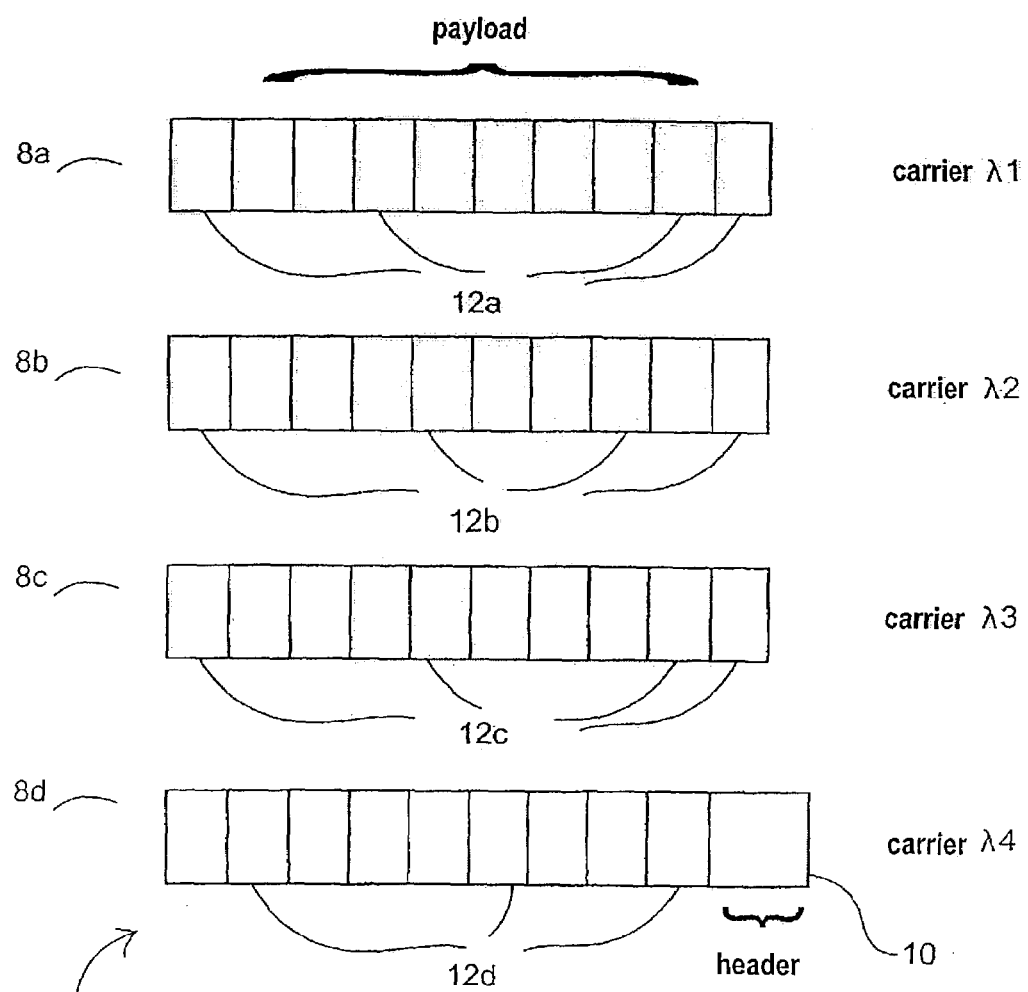
Figure 3:
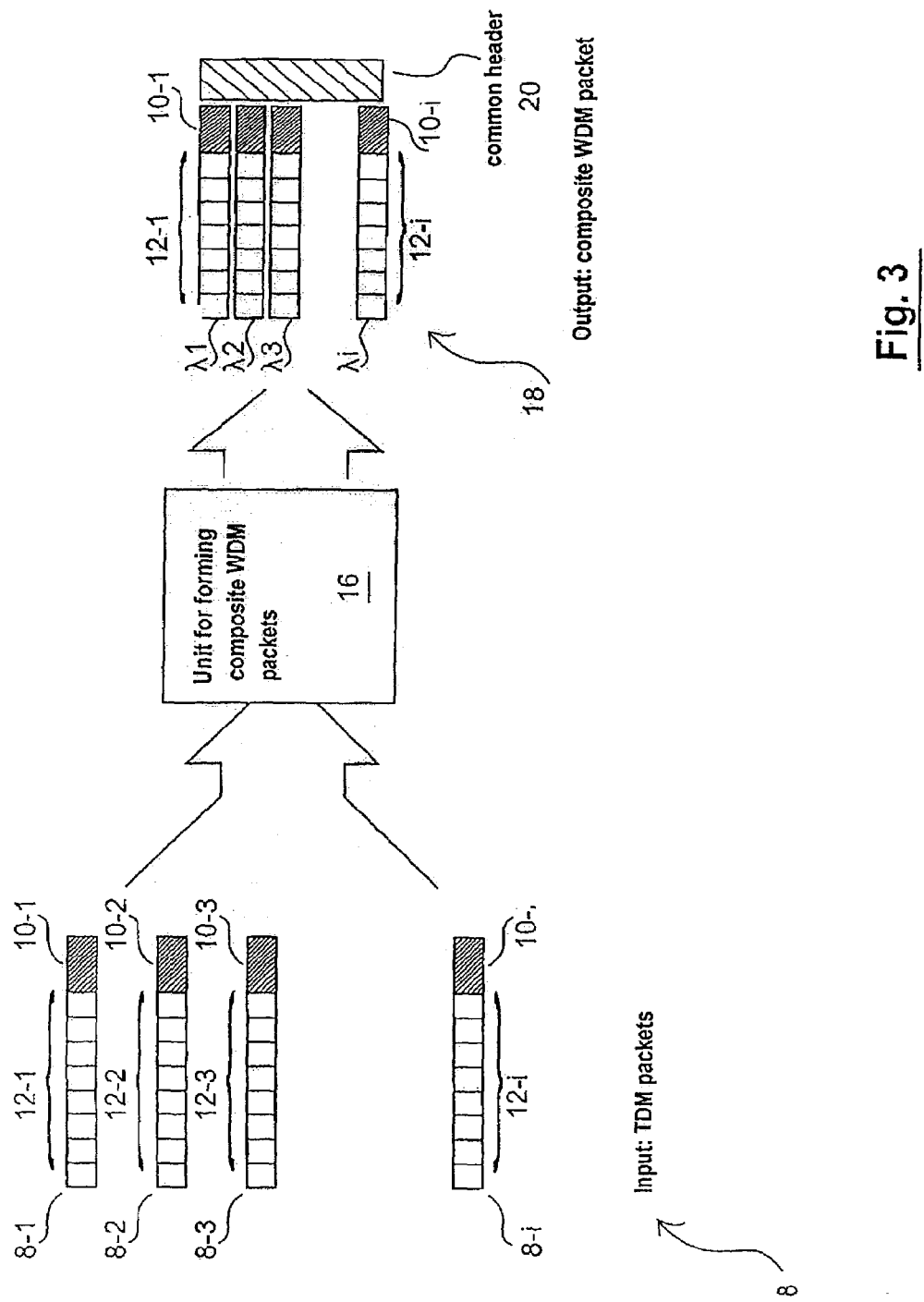
FIG. 3 is a block diagram explaining how the invention constructs a composite WDM packet from TDM packets.

The embodiment shown in FIG. 3 includes a unit 16 whose function is to form wavelength division multiplex optical packets 18 referred to hereinafter as composite WDM packets. Each composite WDM packet is made up of time division multiplex (TDM) optical packets 8, one example of which is described with reference to FIG. 2a. In other words, a composite WDM packet "encapsulates" a set of TDM packets.

Figure 1:
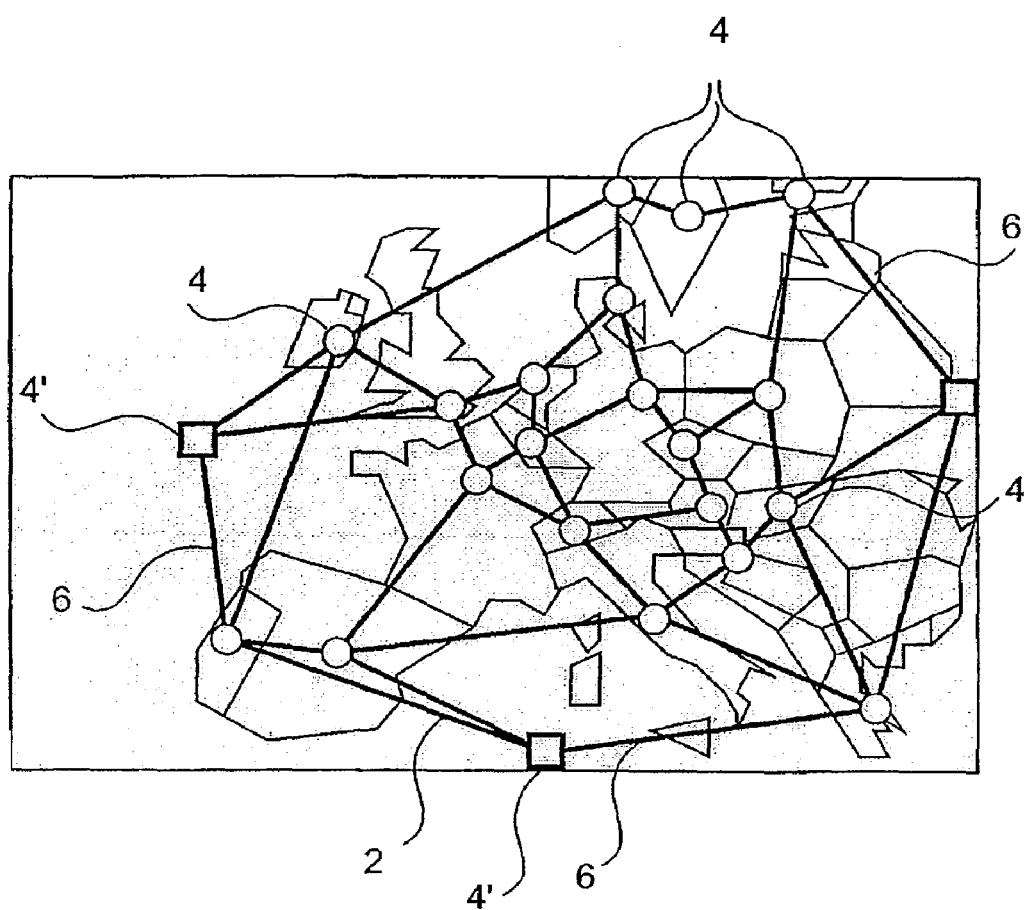
FIG. 1, already described, is a diagram of one example of a continental scale optical communications network.

In the example shown, a composite WDM packet 18 is formed from a number i of TDM packets 8-1 to 8-i, each of the same length and comprising a respective header 10-1 to 10-i and a respective payload 12-1 to 12-i. The TDM packets (generically designated by the reference number 8) that constitute a composite WDM packet 18 can come from the same source or from different sources. However, these TDM packets have the common feature of being intended to transit together over one or more common sections of an optical network, i.e. over at least one link 6 of the network (see FIG. 1).

Because the source of the TDM packets 8-1 to 8-i is immaterial, their respective carrier wavelengths can have any value permitted by the operating protocol used. Accordingly, to take two extreme cases, the packets can all have the same wavelength, for example if they come from the same terminal, or they can all have different wavelengths, and more generally one or more wavelengths common to none or to at least some of the TDM packets.

However, wavelength division multiplexing requires that each multiplex element have its own wavelength, constituting the granularity that enables it to be identified. In this case, because the multiplex element is one of the TDM packet 8-1 to 8-i, the unit 16 for forming composite WDM packets applies the condition that each TDM packet encapsulated in a composite WDM packet 18 must have a carrier wavelength that is specific to it, the wavelengths being designated $\lambda 1$–$\lambda i$ for the TDM packets 8-1 to 8-i, respectively. To this end, the unit 16 includes means for analyzing the wavelengths of the TDM packets 8 present at the input and carrier wavelength conversion means for satisfying the wavelength division multiplexing conditions.

Moreover, the unit 16 includes means for assigning a common header 20 for the composite WDM packet 18. The header is drawn up in conformance with the protocol used by the optical network for routing on the common section or sections. In this example, the common header 20 is coded on all the multiplexed wavelengths $\lambda 1$–$\lambda i$ of the composite WDM packet 18. However, because its role is limited to labeling the packet, the common header 20 can obviously be written in any other manner, for example on only one of the wavelengths, or even on a wavelength other than those that are multiplexed, or on an associated electrical or radio signal, provided that it enables the packet to be indexed. Similarly when it is inside the composite packet, the placing of the common header 20 is arbitrary and a function of the protocol chosen.

The composite WDM packet 18 maintains the original form of the data structure of each of the WDM packets 8 that it encapsulates, in particular the length of the TDM packet, the ordering of the data that constitutes the payload 12-1 to 12-i, and the composition and relative locations of the respective TDM headers 10-1 to 10-i. As a result, it is a simple matter to break down the composite WDM packet during a degrouping operation and to restore each of the TDM packets 8-1 to 8-i to its original form, subject to carrier wavelength conversion where necessary. The TDM packets 8 can then follow their individual routing again or be grouped differently, on the basis of their headers 10-1 to 10-i.

Figure 4:
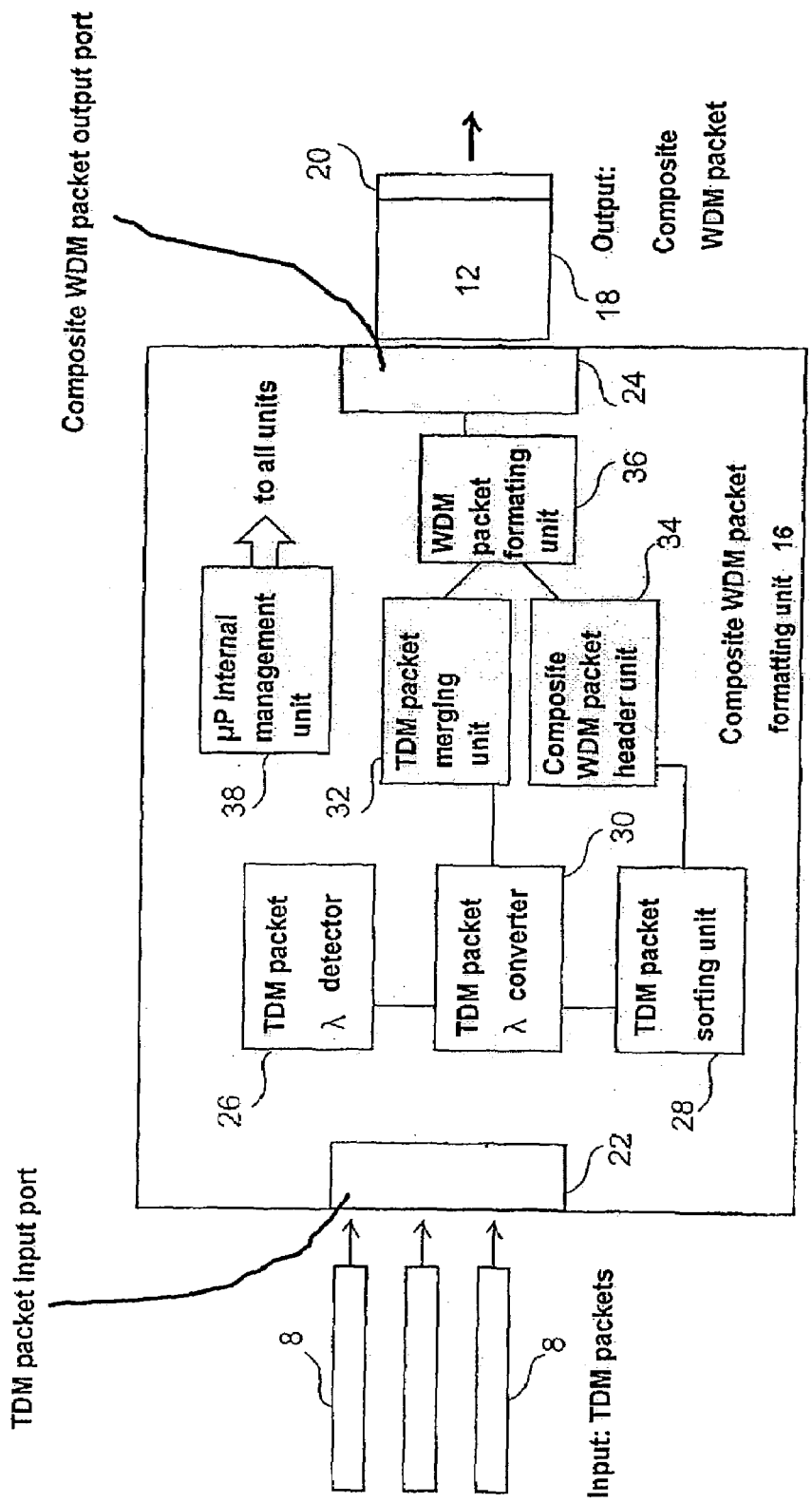
FIG. 4 is a block diagram of a unit from FIG. 3 for forming composite WDM packets.

FIG. 4 shows in the form of a block diagram the units that constitute the unit 16 for forming WDM packets, namely:
- a parallel or serial input port 22 adapted to receive TDM packets 8, an output gate 24 for sending composite WDM packets 18, typically connected to a WDM input port of a switching matrix, a unit 26 for detecting wavelengths λ of TDM packets present at the input port and determining the conversions of the wavelengths λ necessary for wavelength division multiplexing of the composite WDM packet to encapsulate them, a unit 28 for sorting incoming TDM packets, which establishes the composition of each composite WDM packet 18; the sorting takes as a criterion the partial or total commonality of the paths in the optical network over which each TDM packet must travel; to this end, the unit 28 includes means for analyzing the headers 10 of the TDM packets, on the basis of which it calculates or obtains information on a route in the optical network; the sorting unit can be outside the unit 16, in which case the latter operates on the basis that any set of TDM packets 8 present in a given pulse is to be combined into the same composite WDM packet 18; buffer storage means can be provided for managing the sorting and producing optimum groupings, a unit 30 for converting the wavelengths λ of the incoming TDM packet carriers, which thus ensures wavelength division multiplexing of the components (i.e. the TDM packets) of the composite WDM packet being formed; the wavelength conversion can be carried out by any means known in the art, in particular by purely optical means, for example based on non-linear optical phenomena, or using double conversion techniques based on intermediate conversion of the data into electronic form, a unit 32 for merging TDM packets, which combines the TDM packets selected by the sorting unit 28 after wavelength conversion by the unit 30; the unit 32 produces the multiplexed payload of the composite WDM packet; the payload for each of the wavelengths $\lambda 1$–$\lambda i$ (FIG. 3) is a TDM packet containing its own payload 12 and header 10, a unit 34 for creating common headers 20 of composite WDM packets 18, a header including information on the routing of the composite WDM packet on the common section previously cited of the optical network; to this end, the unit 34 is informed of the common section by the unit 28 for sorting TDM packets; in other words, the common header 20 is established as a function of the information contained in the headers 10-1 to 10-i of the TDM packets 8 encapsulated in the associated composite WDM packet, a unit 36 for formatting composite WDM packets, which combines the TDM packets merged and converted to the wavelength division multiplexed form by the unit 32 and the associated common header 20 produced by the unit 34 to constitute a complete composite WDM packet 18 which is then delivered to the output port 24 to be transported over the optical network, and a microprocessor (µp) based internal management unit 38 which controls all of the units 22 to 36.

TDM transmission lines and WDM transmission lines, with coupling between them, can coexist in the same optical communications network 4 because of the unit 16 for forming WDM packets.

To this end, a degrouping unit is additionally provided whose function is the converse of that of the unit 16 for forming composite WDM packets, namely extracting the encapsulated TDM packets 8 from the composite WDM packets.

Figure 5:
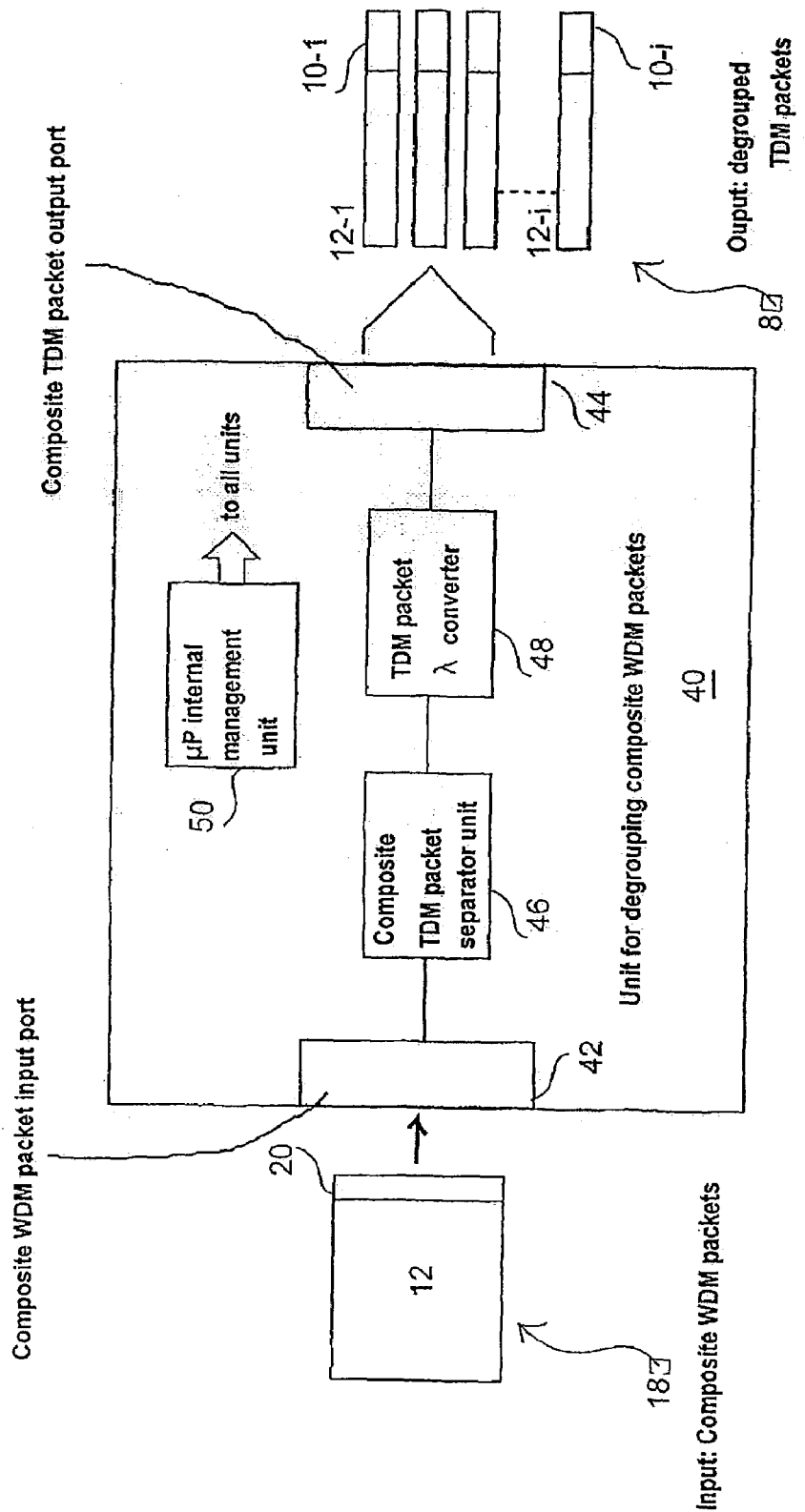
FIG. 5 is a block diagram of a unit for degrouping composite WDM packets to restore the TDM packets that constitute the composite WDM packet.

FIG. 5 shows in the form of a block diagram the units that constitute a unit 40 for grouping composite WDM packets 18, namely:

an input port 42 for receiving composite WDM packets, an output port 44 for sending TDM packets 8 obtained by degrouping composite WDM packets, a unit 46 for separating TDM packets which removes the common header 20 and extracts the TDM packets 8 so that they can be processed individually, a unit 48, implemented using techniques analogous to those of the unit 30 previously cited, for converting the wavelength of degrouped TDM packets from the unit 46 to the carrier wavelength of the TDM line to which the output port 24 is connected, and a microprocessor (µp) based internal management unit 50 which controls the units 42–48.

Combining the two units 16 and 40 for forming and degrouping composite WDM packets into a single bidirectional system sharing common functional elements (ports, conversion unit, management unit, etc.) can of course be envisaged.

A few examples of switching node architectures managing the TDM and WDM modes using units 16 for forming composite WDM packets and/or units 40 for degrouping such packets are described next.

Figure 6:
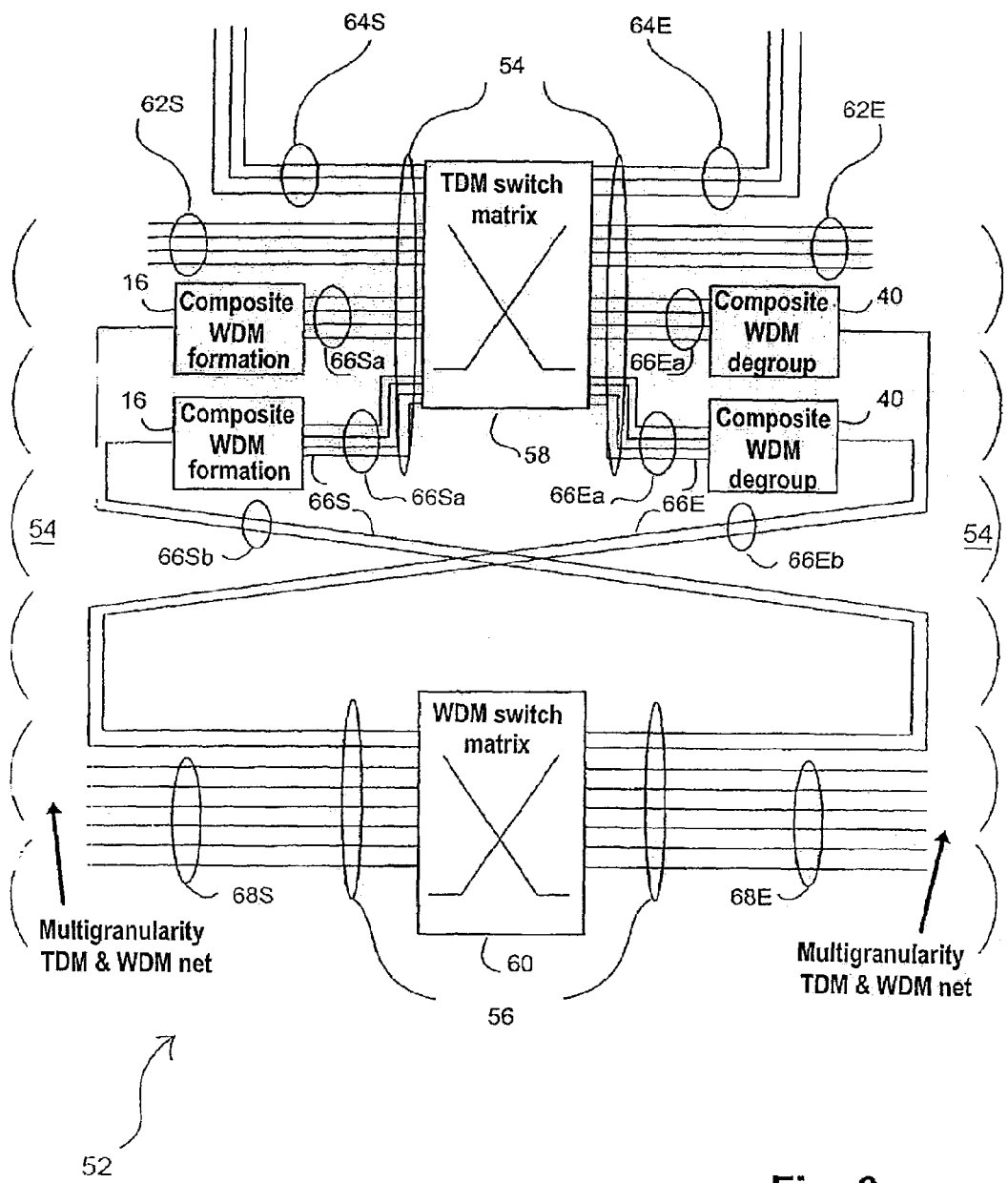
FIG. 6 is a diagrammatic representation of a first embodiment of a simple TDM/WDM conversion node of the invention.

FIG. 6 is a diagrammatic representation of a first embodiment of a simple TDM/WDM converter node 52 of the invention and providing two-way (bidirectional) TDM/WDM conversion. A node of this kind is typically located at one or more ports of an optical network. In the example shown, the network 2 is a multigranularity network in the sense that it processes TDM packets and WDM packets. Furthermore, the network is also a multigranularity network because each WDM packet occupies a varying spectral band, i.e. a varying number i of multiplexed wavelengths. The granularity limit of the fiber is reached if the number i reaches its maximum value, which is equal to the total number of wavelengths that can be conveyed in the same fiber.

The node 52 manages the switching of time division multiplex optical lines 54 (hereinafter referred to as TDM lines) and physically separate wavelength division multiplex lines 56 (hereinafter referred to as WDM lines) by means of a TDM switching matrix 58 and a WDM switching matrix 60, respectively.

The TDM switching matrix 54 acts on three sets of optical lines, namely:

a first set of lines consisting of remote connection lines for which it provides connectivity with other nodes of the network; this set includes external input lines 62E and external output lines 62S, a second set of lines consisting of local connection lines for which it provides connectivity with local equipment units, for example local networks or terminals; this set includes input local lines 64E and output local lines 64S, and a third set of lines consisting of multiplex conversion lines for which it provides connectivity with the WDM switching matrix 60; this set includes respective input lines 66E and output lines 66S (as seen from the TDM matrix).

In alternative embodiments, the TDM switching matrix 58 need not be connected to remote connection lines and need not be connected to local connection lines.

The WDM switching matrix 60 operates on two sets of optical lines, namely:

a first set of lines consisting of remote connection lines for which it provides connectivity with other points of the network; this set includes external input lines 68E and external output lines 68S, and the aforementioned third set of lines consisting of multiplex conversion lines for which it provides connectivity with the TDM switching matrix 58 over the lines 66E and 66S.

The WDM matrix 60 can of course be adapted to manage local lines as well, like the second set of lines consisting of local connection lines. Moreover, an alternative to the above that may be envisaged is for only one of the TDM and WDM matrices 58, 60 to manage remote connection lines, in which case the other is dedicated only to local lines and multiplex conversion lines.

The units 16 and 40 for forming WDM packets and degrouping WDM packets are located in this third set of lines, between the TDM and WDM switching matrices.

To be more specific, the outputs of the TDM switching matrix 58 on the multiplex conversion lines (identified by the reference number 66Sa) reach the input port 22 of a unit 16 for forming composite WDM packets and the output port 24 of that unit leads to a WDM line, or possibly to more than one WDM line (identified by the reference number 66Sb), leading to a WDM conversion input of the WDM switching matrix 60. A plurality of lines 66Sa reach the input port 22 in parallel, the unit 16 thus applying spatial multiplexing. In this example, there are two units 16 for forming WDM packets operating independently of each other and in parallel with each other on the respective lines 66Sa and 66Sb.

Conversely, the outputs of the switching matrix WDM 60 on the multiplexing lines (identified by the reference number 66Eb) reach the input port 42 of a unit 40 for degrouping composite WDM packets and the output port 44 of the latter unit leads to TDM lines (identified by the reference number 66Ea) leading to TDM conversion inputs of the TDM switching matrix 58. In this example the output port 44 of the degrouping unit 40 applies spatial demultiplexing to distribute the degrouped TDM packets 8 in parallel to respective input lines of the section 66Ea. Other demultiplexing possibilities can of course be envisaged, such as serial transmission from the output port 44, or with demultiplexing on an arbitrary number of different lines. In this example two units 40 for degrouping WDM packets operate independently of each other and in parallel with each other on respective lines 66Sa and 66Sb.

In operation, the node 52 operates transparently and without distinction both on TDM and on WDM lines. The TDM and WDM switching matrices carry transit information on their respective remote connections 62E, 62S and 68E, 68S. If routing from the node 52 with multiplex conversion is required, the matrices route the data on the third set of lines previously cited.

In the case of TDM to WDM conversion, the TDM switching matrix 58 switches the TDM packets 8 concerned onto lines 66Sa leading to an available unit 16 for forming composite WDM packets. For reintegrating a degrouped TDM packet (or packets) into a new composite WDM packet 18, it is immaterial whether the TDM packets come from remote connection input lines 62E or local connection input lines 64E, or even from a degrouped TDM packet output of the lines 66Ea. The TDM packets 8 switched in this way are received by a unit 16 for forming composite WDM packets in which they are grouped into the form of a composite WDM packet. The composite WDM packets formed in this way are received on the lines 68E of the WDM switching matrix, from which point onwards they are processed transparently, like any standard WDM packet. The transit of a composite WDM packet 18 into the WDM switching matrix and beyond is managed with reference to its common header 20.

In the case of WDM to TDM conversion, the WDM switching matrix 60 switches the packets concerned onto lines 66Eb leading to an available unit 40 for degrouping WDM packets. Each WDM packet received is then divided into TDM packets 8, if necessary with carrier wavelength conversion so as to be compatible with the input line 66Ea of the TDM switching matrix 58. However, some TDM switching matrices can accept any wavelength at the input, although they deliver only one wavelength at the output. In this case, there is no point in providing wavelength conversion downstream of the TDM switching matrix 58. From these lines, the degrouped TDM packets are processed transparently like any other TDM packet. Thus they can be directed over different paths for a remote connection on a line 62S or for a local connection on a line 64S or redirected to a unit 16 for formatting composite WDM packets in order to be selectively integrated into a new composite WDM packet to be managed by the WDM switching matrix 60.

Figure 7:
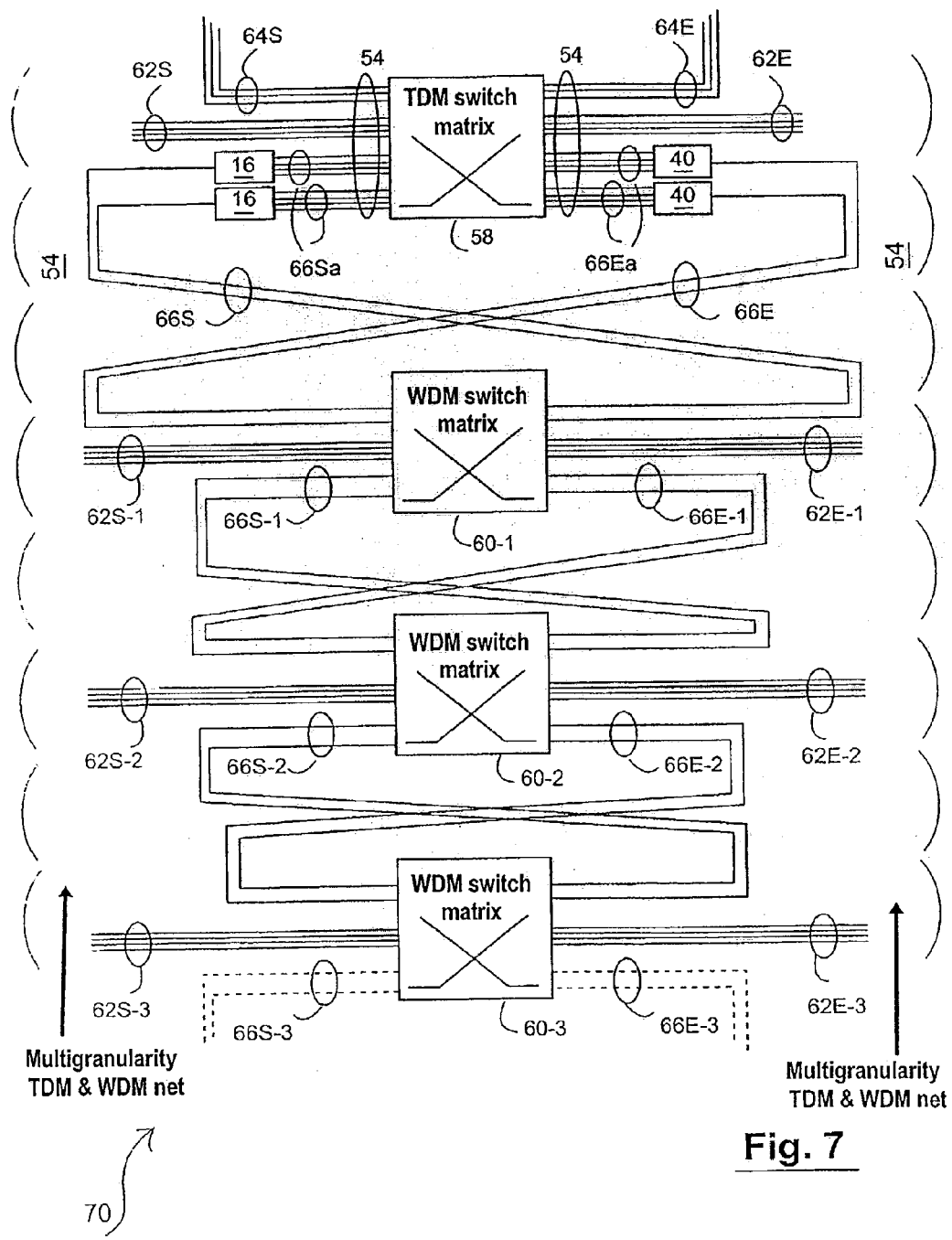
FIG. 7 is a diagrammatic representation of a second embodiment of a simple TDM/WDM conversion node of the invention.

FIG. 7 is a diagrammatic representation of a second embodiment of a TDM/WDM conversion node 70 of the invention which differs from the first embodiment in that it uses cascaded multiple WDM switching matrices 60-1 to 60-3 to provide a plurality of WDM line grouping levels. In this figure, for conciseness, elements common to FIG. 6 are identified by the same reference numbers and are not described again (although, for clarity, the lines 68E and 68S in FIG. 6 are respectively designated 68E-1 and 68S-1 in FIG. 7). The WDM switching matrix 60-1 is analogous to the matrix 60 in FIG. 6, but further includes a set of lines 66E-1 and 66S-1 which respectively connect it to output ports and input ports of a second WDM switching matrix 60-2.

The latter also has remote connection input and output lines 68E-2 and 68S-2, respectively, and a set of lines 66E-2 and 66S-2 that connect it to output ports and input ports, respectively, of a third WDM switching matrix 60-3.

The interconnection lines as a whole (designated with the prefix 66) between the switching matrices 55, 60-1, 60-2 and 60-3 route to the TDM switching matrix 58 any packet from any remote connection line (designated with the prefix 62) by simple progressive switching. Accordingly, a composite WDM packet in transit on a line 62E-3 of the WDM switching matrix 62-3 can be routed successively to the WDM matrices 60-2 and 60-1, whence it transits over a line 66E to be degrouped in a degrouping unit 40 and then processed in the form of TDM packets 8 by the TDM switching matrix 58.

Conversely, TDM packets 8 from the switching matrix 58 can be formed into composite WDM packets 18 in a unit 16 and then transmitted in that form over output interconnection lines in order to be routed to any of the WDM switching matrices 60-1 to 60-3. This achieves bidirectional exchange between the TDM and WDM switching matrices.

Of course, the number of WDM switching matrices that can be concatenated in this way is arbitrary, and WDM matrices can be removed or added, for example using interconnection lines 30-3 (shown in dashed line) of the WDM switching matrix 60-3.

This architecture with successive WDM matrices has the particular benefit of combining a plurality of composite WDM packets into a common composite WDM packet referred to hereinafter as a superpacket, for example to share a common section.

Figure 8:
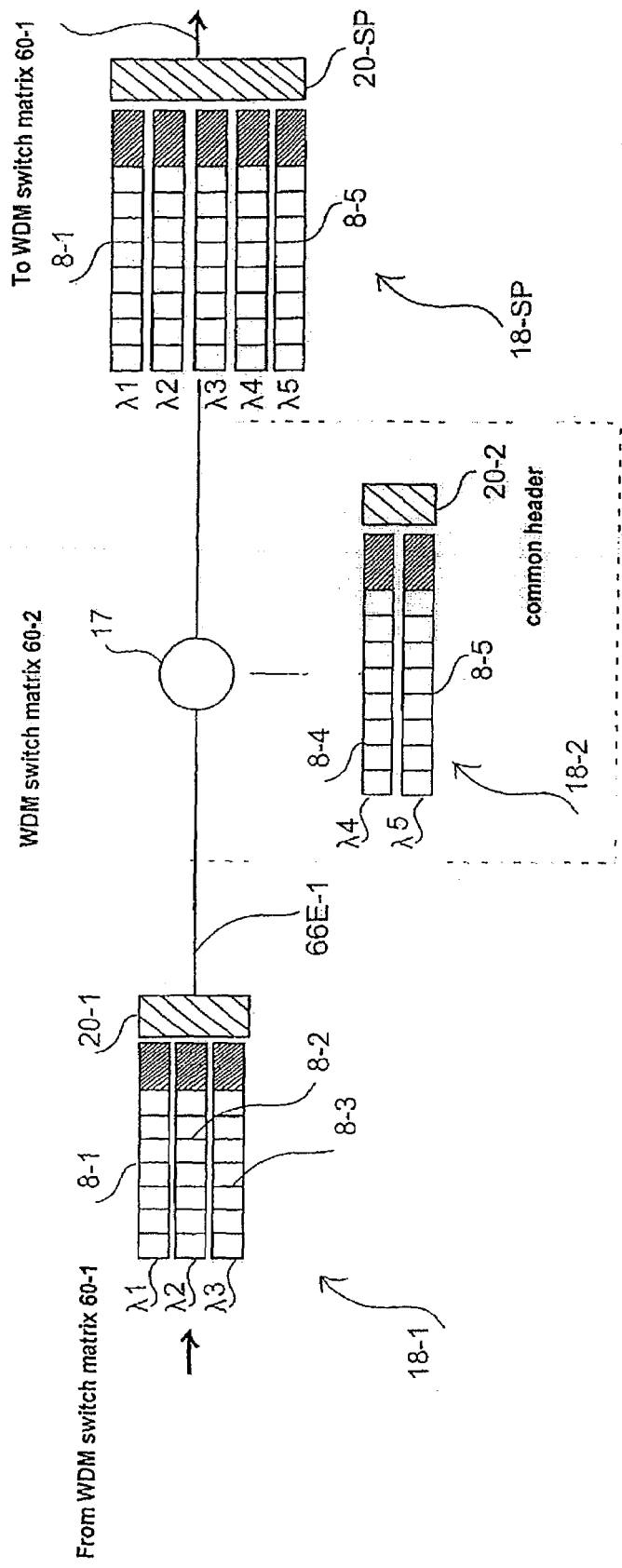
FIG. 8 is a block diagram showing how a composite WDM superpacket is formed from a plurality of composite WDM packets.

FIG. 8 shows by way of example a situation in which the WDM matrix 60-2 receives over the line 66E-1 from the WDM matrix 60-1 a composite WDM packet 18-1 comprising three wavelengths λ1, λ2 and λ3 conveying respective TDM packets 8-1 to 8-3. The WDM matrix 60-2 produces a composite packet 18-2 comprising two wavelengths λ4 and λ5 associated with respective TDM packets 8-4 and 8-5. This matrix analyses the common header 20-1 of the composite WDM packet 18-1 and determines if it can be added to the packet 18-2 currently being produced, for example because of a common section. If so, the WDM matrix 60-2 produces the composite WDM superpacket 18-SP comprising the WDM packets 18-1 and 18-2 in a combiner unit 17. To this end, it removes the common header 20-1 from the incoming composite WDM packet 18-1 and, where appropriate, the header 18-2 from the composite WDM packet being produced, in order to substitute a header 20-SP specific to the WDM superpacket and including all the information necessary for routing the WDM superpacket, possibly with supplementary information for determining further downstream that that there are two composite WDM packets and for subsequently separating the two packets.

The composite superpacket 18-SP can be transmitted like any other composite WDM packet, for example to the WDM matrix 60-1.

Figure 9:
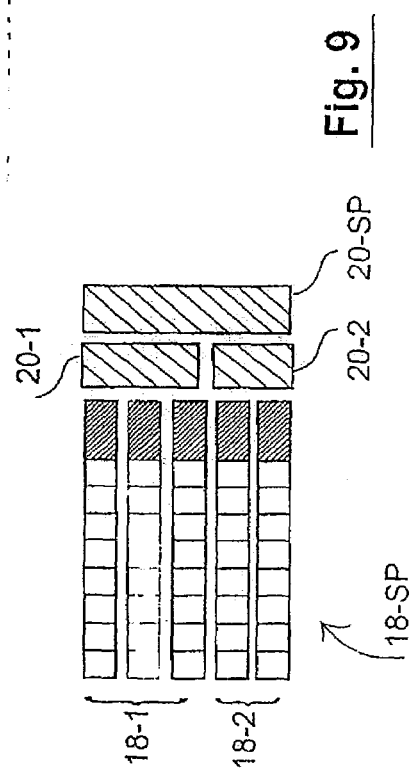
FIG. 9 is a diagram showing the structure of a composite WDM superpacket that is a variant of that shown in FIG. 8.

As an alternative to the above, the WDM switching matrix 60-2 can keep the common headers 20-1 and 20-2 of the constituent composite WDM packets 18-1 and 18-2 in the superpacket 20-SP, in their original position, and add the superpacket header 20-SP (i.e. a superheader) to encompass the two headers, as shown in FIG. 9. In this case, the degrouping unit 40 can be adapted to analyze the superheader first and then to analyze the common headers 20-1 and 20-2 of the composite WDM packets that constitute the superpacket 20-SP.

In the simplified example, there is no wavelength conflict in creating the superpacket 18-SP, each of the individual constituent TDM packets 8-1 to 8-5 having its own wavelength λ1 to λ5. Wavelength conversion means can nevertheless be provided in the WDM switching matrices 60 for selectively changing the wavelength of a TDM packet in a composite WDM superpacket to avoid any spectral band occupancy conflict.

Of course, within the limit of the spectral band of the network element concerned, the number of TDM packets in a composite WDM superpacket and the number of composite WDM packets combined to form this kind of superpacket are arbitrary. Similarly, WDM superpackets can be produced from other superpackets.

The facility to form and use superpackets is available to any WDM switching matrix and this applies equally to architectures other than that described with reference to FIG. 7. Moreover, units can be provided specific to creating WDM superpackets outside WDM switching matrices.

One practical option is for the number of wavelengths of each incoming WDM packet to be the same.

Figure 10:
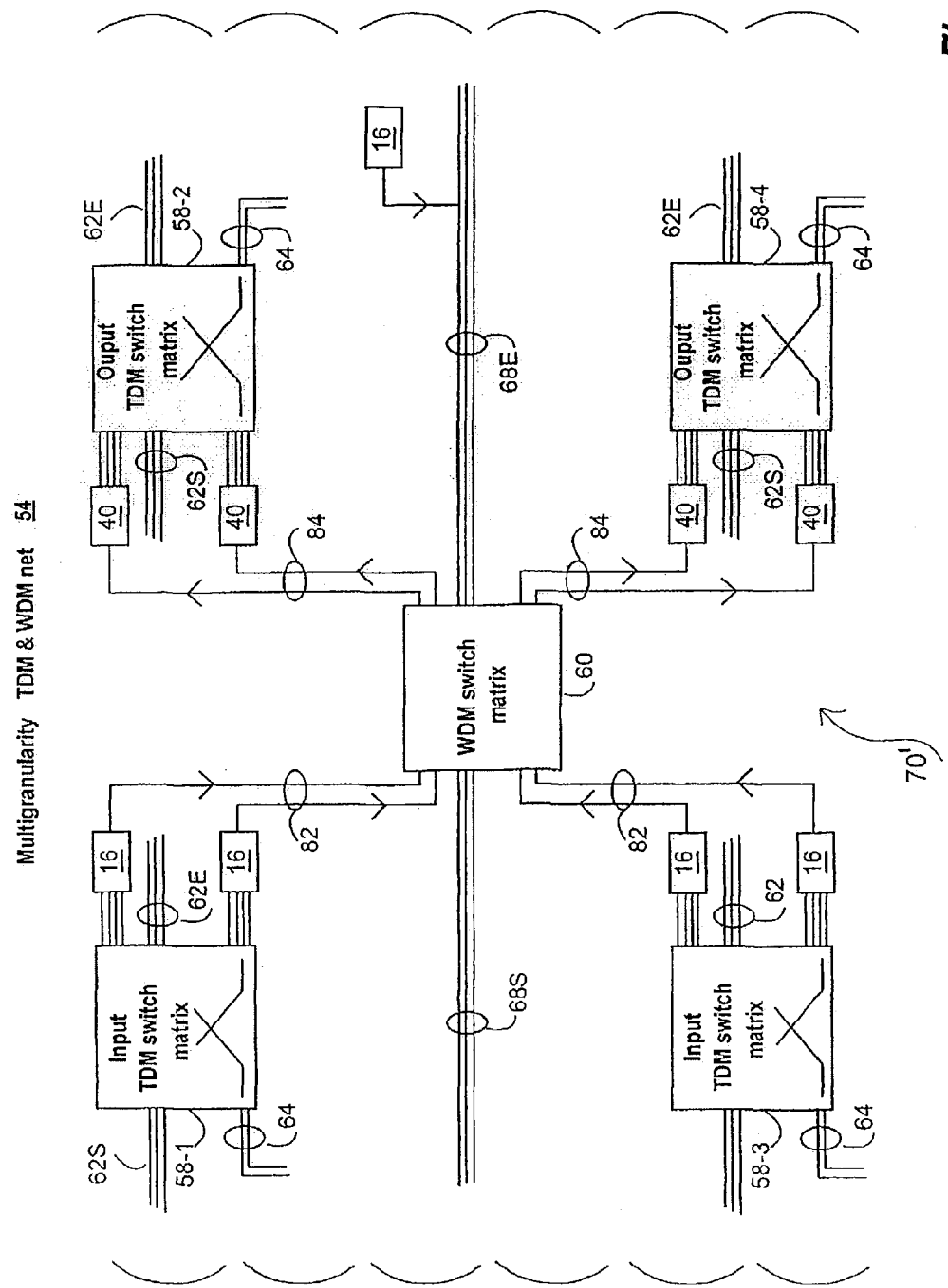
FIG. 10 is a diagrammatic representation of a third embodiment of a TDM/WDM conversion node of the invention.

FIG. 10 is a diagrammatic representation of a third embodiment of a TDM/WDM conversion node 70' of the invention. In this example the architecture groups four TDM switching matrices 58-1 to 58-4 together around a WDM switching matrix 60 in a star configuration. The four TDM switching matrices comprise two input matrices 58-1 and 58-3 (on the left in the figure) serving as an input source and two output matrices 58-2 and 58-4 (on the right in the figure) serving as destinations vis-à-vis the central WDM switching matrix 60.

Each input TDM switching matrix 58-1 and 58-3 communicates with the WDM switching matrix 60 via two units 16 for forming groups of composite WDM packets, offering two parallel paths to the WDM switching matrix 60 (lines 82). Similarly, each output TDM switching matrix 58-2 and 58-4 communicates with the WDM switching matrix 60 via two units 40 for degrouping composite WDM packets, offering two parallel paths from the WDM switching matrix.

The TDM switching matrices can communicate with each other via the WDM switching matrix or directly. The matrices can also have remote connection lines 62E, 62, 68E, 68S and local connection lines 64.

The number of TDM switching matrices star-connected in this way to a WDM switching matrix is arbitrary.

Figure 11:
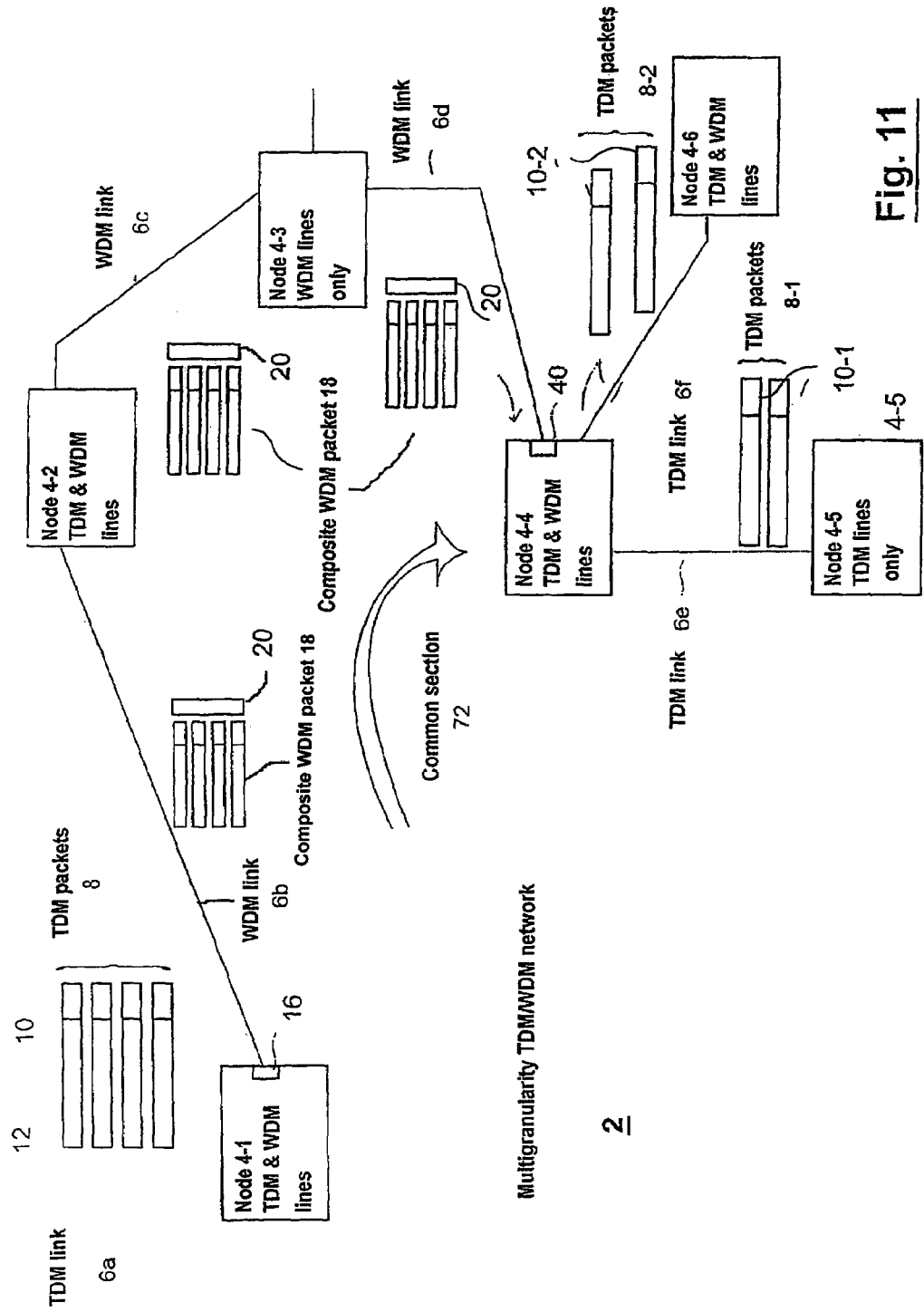
FIG. 11 shows an example of the implementation of a node architecture of the invention in the context of a multigranularity optical network adapted to convey data in the form of TDM and WDM packets.

FIG. 11 shows node architectures and packet structures described above with reference to FIGS. 3 to 8 in the context of a multigranularity optical network 2 adapted to convey data in the form of TDM and WDM packets.

The example considers the case of data in transit in the form of TDM packets 8 arriving at a node 4-1 on a TDM link 6a. Of these packets, a first set 8-1 is addressed to a specified node 4-5 and a second set 8-2 is addressed to another specified node 4-6. The routes to the destination nodes pass through successive common intermediate nodes 4-2, 4-3 and 4-4 that collectively form a common section 72. The common intermediate nodes and the links 6b, 6c, 6d that connect them are adapted to convey WDM packets.

Moreover, the first node 4-1 and the last node 4-4 of the common section are respectively equipped with a unit 16 for forming composite WDM packets 18 and a unit 40 for degrouping composite WDM packets 18.

In accordance with the invention, the first and second sets of TDM packets 8-1 and 8-2 are combined in a composite WDM packet 18 for transit over the common section 72. This is advantageous in particular because it exploits the very wide bandwidth offered by the WDM technique and uses only one input port and one output port for each of the common intermediate nodes 4-2 to 4-4. Routing on this common section is managed with reference to the common header 20 of the composite WDM packet, which among other things specifies the last common node 4-4.

When the composite WDM packet 18 reaches the last node 4-4 of the common section, it is processed by the latter's degrouping unit 40 to extract therefrom the TDM packets of the encapsulated sets 8-1 and 8-2. The node 4-4 then switches the packets to their final destination nodes 4-5 and 4-6, respectively, over the links 6e and 6f. The information on routing from the last node 4-4 of the common section is obtained from the headers 10-1 and 10-2 of the TDM packets 8-1 and 8-2, respectively. Of course, the routing of these packets can involve an arbitrary number of network nodes, as a function of their final destination. It is then possible for one of the sets of TDM packets to be encapsulated again in a composite WDM packet with other TDM packets to share another common section.

It is not imperative for each node of the optical network 2 to be equipped to manage both TDM packets and WDM packets, although this is the optimum solution. Thus, in accordance with the invention, routing over the intermediate section 72 can be effected even if one or more of the nodes can manage only WDM lines (the node 4-3 in this example). Similarly, outside a given common section, one node can manage only TDM packets (the node 4-5 in this example).

Other examples of architectures and routing analyses that can be envisaged in the context of the invention can be adapted from the teachings of the following documents, which cover multigranularity optical networks in general: i)

L. Noirie et al., "Multigranularity optical cross-connect", ECOC'2000, paper 9.2.4, and ii) L. Noirie et al., "Impact of intermediate traffic grouping on the dimensioning of multigranularity optical networks", OFC'2001, paper TuG3.

It will be obvious to the person skilled in the art that the invention lends itself to many variants, both structural and functional, that do not depart from the scope of the invention.

What is claimed is:

1. An optical switching node (52; 70), comprising:
    at least one matrix (58) for switching time division multiplex packets (8),
    at least one matrix (60) for switching wavelength division multiplex packets,
    at least one device (16) for forming wavelength division multiplex optical data packets (18), the device having an input (22) coupled to a matrix (58) for switching time division multiplex packets (8) and an output (24) coupled to a matrix (60) for switching wavelength division multiplex packets,
    wherein the device (16) for forming wavelength division multiplex optical data packets (18) is adapted to select time division multiplex optical packets from the matrix (58) for switching time division multiplex packets which are intended to be conveyed together over at least a common section of an optical network, and to form composite wavelength division multiplex packets each including said time division multiplex packets selected by causing them to be carried by respective wavelengths and by associating them with a common header (20), and
    at least one device (40) for demultiplexing wavelength division multiplex optical packets, the device having an input (42) coupled to the matrix (60) for switching wavelength division multiplex packets and an output (44) coupled to the matrix (58) for switching time division multiplex packets,
    wherein said matrix (60) for switching wavelength division multiplex packets has inputs (68E) and outputs (68S) for receiving and sending wavelength division multiplex packets from and to other nodes.

2. A node according to claim 1, characterized in that the device (16) for forming wavelength division multiplex optical data packets further comprises means (17) for combining a plurality of composite wavelength division multiplex packets (18-1, 18-2) into a single composite wavelength division multiplex packet (18-SP).

3. A node (70) according to claim 1, characterized in that a time division multiplex packet switching matrix (58) has inputs (62E) and outputs (62S) for receiving and sending time division multiplex packets from and to other nodes.

4. A node (70) according to claim 1, characterized in that a time division multiplex packet switching matrix (58) has inputs (64E) and outputs (64S) for receiving and sending time division multiplex packets from and to local stations.

5. A node (70) according to claim 1, characterized in that the time division multiplex packet switching matrix (58) is coupled to a cascade of wavelength division multiplex packet switching matrices (60-1 to 60-3), one of which can receive optical data coming from the time division multiplex packet switching matrix (58) via a device (16) for forming wavelength division multiplex optical data packets (18) and, where applicable, send optical data to the time division multiplex packet switching matrix (58) via a device (40) for demultiplexing wavelength division multiplex optical packets (40).

6. A node (70') according to claim 1, characterized in that it comprises a wavelength division multiplex packet switching matrix (60) connected in a star configuration to time division multiplex packet switching matrices (58-1 to 58-4) comprising:
    an input time division multiplex packet switching matrix (58-1, 58-3) connected to an input of the wavelength division multiplex packet switching matrix (60) via a device (16) for forming wavelength division multiplex optical data packets (18), and
    an output time division multiplex packet switching matrix (58-2, 58-4) connected to an output of the wavelength division multiplex packet switching matrix (60) via a device (40) for demultiplexing wavelength division multiplex optical packets.

7. A node according to claim 1, characterized in that it includes means (28) for selecting time division multiplex packets (8) to form a wavelength division multiplex packet (18) by identifying common sections (72) to be taken by the data of said packets (8).

8. An optical communications network (2) for transporting data in the form of packets and for managing both time division multiplex packets (8) and wavelength division multiplex packets (18), which network is characterized in that it includes a node according to claim 1.

9. The optical switching node (52; 70) of claim 1 wherein said matrix (60) for switching wavelength division multiplex packets has inputs (68E) and outputs (68S) for receiving and sending wavelength division multiplex packets from and to other nodes.

10. The optical switching node according to claim 1, wherein the packet-forming device (16) is adapted to form a composite wavelength division multiplex packet that encapsulates a plurality of time division multiplex packets while maintaining an original form of said time division multiplex packets.

11. An optical switching node, comprising:
    means for switching time division multiplex (TDM) packets;
    means for switching wavelength division multiplex (WDM) packets;
    means for forming WDM optical data packets and outputting the WDM optical data packets to the WDM packet switching means, said means for forming WDM optical data packets being connected to receive TDM packets from the TDM packet switching means,
    wherein the means for forming WDM optical data packets is adapted to select time division multiplex optical packets from the means for switching TDM packets which are intended to be conveyed together over at least a common section of an optical network, and to form composite WDM packets each including said TDM packets selected by causing them to be carried by respective wavelengths and by associating them with a common header; and
    means for demultiplexing WDM optical packets received from the WDM packet switching means, said means for demultiplexing being connected so as to output the demultiplexed WDM optical packets to the TDM packet switching means;
    means for outputting the formed WDM optical data packets to WDM optical lines; and
    means for outputting the TDM optical data packets, demultiplexed from the WDM optical packets, to TDM optical lines.

* * * * *